Nov. 21, 1933.   E. E. METCALF   1,935,811
AGRICULTURAL IMPLEMENT
Filed Oct. 16, 1931   4 Sheets-Sheet 3

Inventor:
Edgar E. Metcalf
By:
Brown, Jackson, Boettcher & Dienner
Attys

Nov. 21, 1933.  E. E. METCALF  1,935,811
AGRICULTURAL IMPLEMENT
Filed Oct. 16, 1931  4 Sheets-Sheet 4

INVENTOR:
Edgar E. Metcalf
By: Brown, Jackson, Boettcher & Diemer
ATTORNEYS.

Patented Nov. 21, 1933

1,935,811

UNITED STATES PATENT OFFICE 1,935,811

AGRICULTURAL IMPLEMENT

Edgar E. Metcalf, Moville, Iowa, assignor to Deere & Company, Moline, Ill., a corporation of Illinois Application October 16, 1931. Serial No. 569,141

24 Claims. (Cl. 180—53)

This invention relates to a new and improved power drive means extending between a tractor and a propelled implement and through which power is transmitted from a driving shaft driven from the tractor engine to a driven shaft on an implement, the latter shaft being adapted for driving implement mechanisms.

My invention contemplates, in its broader aspects, the use of a double or tandem universal unit connected with the power shaft, a duplicate unit connected with the driven shaft, and an extensible and contractible intermediate power transmission shaft connecting the aforesaid universal units by virtue of which, when embodied in a tractor and a propelled implement, shorter turns can be made when turning as at the ends of fields and the like, and when the implements are advancing in normal straight forward relation or when making turns, the implement shaft will be driven at a uniform velocity, thus reducing vibration and wear.

The principal object of my invention is to provide independent means for cooperating with each of the shaft connections, the latter comprising the tandem universal units, in such a manner that the angularity between the respective shafts will be substantially equally divided with respect to the tandem universal units. As a rule, a universal joint does not work well if the angle between the axes of the two shafts connected by the joint is more than 45°. The smaller the angle, the better will the joint function. It is for this reason that I have devised the tandem universal units, and in addition thereto, I have devised further mechanism that is also capable of universal movement and which is so positioned relative to the tandem universal units to cooperate therewith for obtaining substantially equal angularities between the different rotatable power transmitting elements and their respective connections through the universal joints.

A further object of this construction is to obtain a substantially uniform angular velocity in the driven shaft of the implement thus materially reducing vibration and wear. The present device transmits substantially uniform driving power to the implement mechanisms regardless of the relative tilting of the tractor and the implement as they pass over undulations in the ground and regardless of the ordinary weaving or deviations of the two vehicles relative to one another and relative to their fore and aft alignment when in operative use. The same is true when the vehicles are negotiating a turn.

In order to transmit uniform angular motion from a driving shaft to a driven shaft through universal joints, when the shafts assume various angular positions relative to each other, two universal joints have been used which are connected in tandem. The pair of universal joints are connected together with forks disposed at the opposite ends of a connecting element with the pivotal axes of the forks lying in the same plane. However, this construction by itself will not transmit a uniform angular motion to the driven shaft unless the angle between the drive shaft and the connecting element is substantially equal to the angle between the driven shaft and said element. If these angles are substantially equal the non-uniform motion transmitted to the connecting element by the driving shaft through the first universal joint will be compensated and converted into a uniform motion to the driven shaft by the second universal joint. Therefore, the problem was to provide a means which maintains the angularities between the respective shafts and the connecting element substantially equal. Such a means has been provided in the present invention and is associated with each of the tandem universal units to obtain the result desired. Preferably this connecting element or intermediate shaft between the two associated individual universal joints is made short whereby its mass is not great enough to introduce any great amount of vibration when rotating at a non-uniform rate.

A still further object of my present invention is to provide a power drive means which will permit of a maximum amount of angular displacement between the tractor and the pulled implement when the vehicles are turning. Other objects and advantages will hereinafter appear from the following detailed description having reference to the accompanying drawings wherein a preferred embodiment of my invention is disclosed.

In the drawings:

Figure 7 is a perspective view of one of the elements employed for the connection between the two universal couplings which forms one of the tandem universal units;

Figures 1, 4, 5, 6:
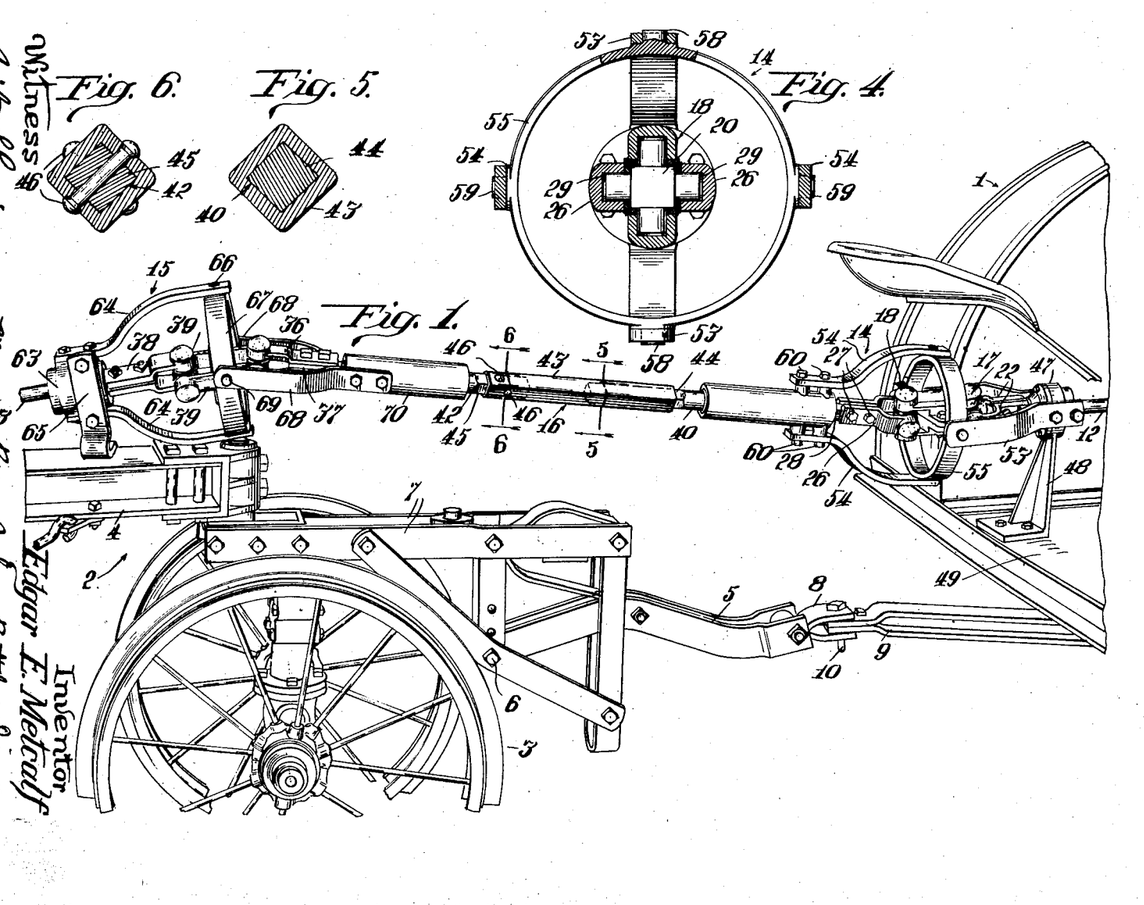
Figure 1 is a general perspective view of the power transmitting mechanism as applied between pulling and pulled vehicles, the latter being only fragmentarily illustrated.
Figure 4 is a vertical cross-sectional view through one of the universal joints taken substantially along the plane of line 4—4 of Figure 2, with the ring element of the cooperating means partially broken away and in section.
Figure 5 is a cross sectional view taken through the extensible connection provided between the two sections of the transmission shaft, and in the plane of line 5—5 of Figure 1.
Figure 6 is another cross sectional view corresponding to the view in Figure 5, but taken in the plane of line 6—6 of Figure 1.

The drive means may be conveniently connected between any two vehicles for transmitting power from one vehicle to the other, however, the same has been illustrated by way of example as connected between a tractor 1 and a farming implement 2. The type of implement shown is provided with a tongue truck 3 for pivotally supporting the tongue 4 of the implement. The tongue 5 of the tongue truck is pivotally mounted at 6 on the truck frame 7 for vertical movement relative thereto and is provided at its forward end with a pivoted clevis 8. The tongue 5 is pivotally connected with the draw bar 9 of the tractor by means of a coupling pin 10. The foregoing construction is old and well known to those skilled in the art and no further description thereof is necessary.

The power take-off drive mechanism of the tractor 1 comprises a power driven shaft 12 carried by the tractor and connected with the power plant thereof, a driven shaft 13 carried by the implement and connected with the implement mechanisms to be driven, a pair of double or tandem universal units 14 and 15 connected with shafts 12 and 13, respectively, and a telescoping intermediate power transmission shaft 16 extending between said couplings.

Figures 1, 2, 3:
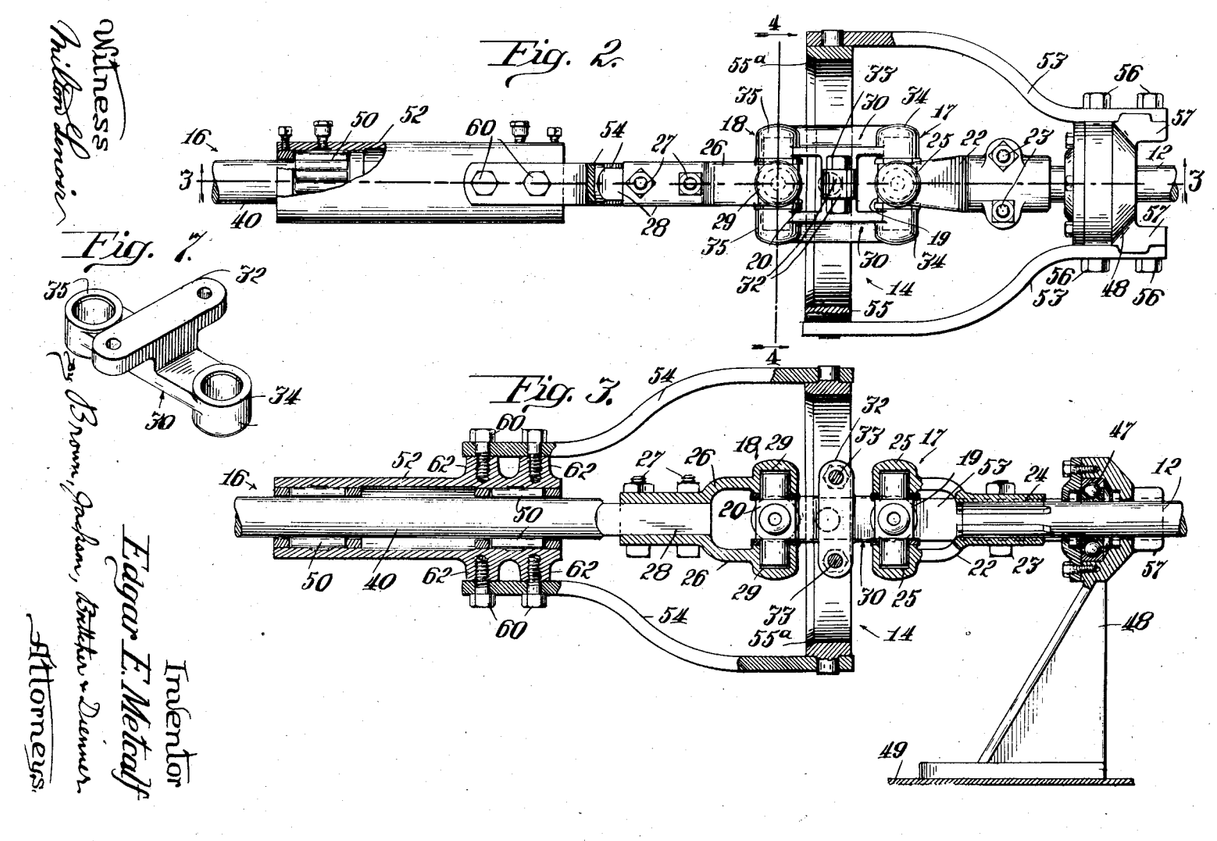
Figure 2 is a fragmentary plan view of one of the double universal units and its cooperating mechanism, with some of the parts thereof broken away and in section.
Figure 3 is a vertical cross sectional view taken substantially along the plane of line 3—3 in Figure 2.

Referring now to Figures 2 and 3, the universal joint unit 14 is illustrated clearly on an enlarged scale and comprises double or tandem universal coupling 17 and 18, respectively. Each coupling unit is provided with studded universal blocks 19 and 20, respectively, the studs on said blocks being arranged in cross formation, that is, spaced angularly 90° apart on each of the blocks in the manner best shown in Figure 4. A two piece yoke comprising arms 22 is fastened together and to the splined end of the power take-off shaft 12 by means of bolts 23 or by any other suitable means, the two arms 22 having splined portions 24 for interengagement with the shaft splines. Each of the arms of the yoke are further provided with sockets 25 adapted for pivotally receiving two of the oppositely related studs of blocks 19.

A substantially similar construction is utilized for connecting the intermediate shaft 16 with the universal block 20 and constitutes a two piece yoke comprising arms 26 fastened together by means of bolts 27 or the like and to the squared end 28 of shaft 16. The arms 26 are provided with sockets 29 adapted for pivotally receiving two of the oppositely related studs of the block 20. The universal blocks 19 and 20 are connected by means of a coupling member comprising two separable links 30, one of which is clearly illustrated in Figure 7. Each link 30 is provided with laterally extending ears 32 having apertures for receiving bolts 33 and the latter securely fasten the two links together to form a rigid unit. Each link is further provided with sockets 34 and 35, respectively for pivotally engaging the remaining pairs of oppositely related studs on blocks 19 and 20, respectively.

The tandem universal unit 15 is a duplicate of the above described coupling 14, and briefly comprises a yoke unit 36 secured to the squared end 37 of shaft 16 and connected with the studs of one block, a second yoke unit 38 secured to the splined end of the implement shaft 13 and connected with the studs of a second block, and a coupling member 39 engageable with the remaining studs of the two blocks for operatively connecting the latter.

As hereinbefore referred to, the intermediate shaft 16 is of telescopic construction and may, of course, be constructed in any suitable manner. However, a preferred construction thereof is exemplified in Figures 1, 5 and 6 and consists of two shaft sections 40 and 42 telescopically connected by means of a sleeve 43. Each of said shafts 40 and 42 are provided with squared ends 44 and 45, respectively, and the sleeve 43 is of square cross section having its one end slid over the squared end 45 of shaft section 42 and securely fastened to the latter by any suitable means such as one or more rivets 46. The other end of sleeve 43 is adapted to slidably receive the squared end 44 of shaft 40 therein. With a shaft of this construction positive power transmission is effected at all times and yet the overall length of the power transmission shaft is variable to accommodate the variations in the distance between the two tandem universal units 14 and 15 when the pulled and pulling vehicles tilt relatively to each other as they travel over undulations in the ground or when they are negotiating a turn.

The manner in which the shafts 12, 13 and 16 are mounted and operably controlled, to function in their desired capacities through the tandem universal units, is accomplished with the following novel construction. The shaft 12 is rotatably mounted in a ball bearing 47 carried by a supporting bracket 48 which is suitably secured to the tractor frame or platform 49. The tractor end of shaft 16 is rotatably and slidably confined within roller bearings 50 carried within a sleeve 52, and the latter is supported for universal movement by means of a universal mechanism which receives its support through bracket 48.

This universal mechanism constitutes two pairs of arms 53 and 54, which may be made interchangeable if desired, connected with the bracket 48 and the sleeve 52, respectively, and these pairs of arms are pivotally joined by means of a ring 55 for universal movement relative to each other. The arms 53 are securely fastened by means of cap screws 56 or other means to suitable pads 57 formed integrally with the bracket 48 and are thereby maintained in fixed relation to the tractor. The free ends of arms 53 have apertures therein for pivotally receiving a pair of oppositely related pintles 58 projecting outwardly from the periphery of ring 55. Another pair of oppositely related pintles 59 likewise project outwardly from the ring 55 and rotatably operate within the apertures formed in the ends of arms 54, the latter pintles, however, being spaced 90° apart from the pintles 58 on the periphery of ring 55. The other ends of the arms 54 are secured by any suitable means such as cap screws 60 to bosses 62 projecting from the sleeve 52.

A universal mechanism of duplicate construction to that above described surrounds and cooperates with the tandem universal joint unit 15. In this case a bearing 63 having a pair of arms 64 securely fastened therewith is mounted on a bracket 65 fixedly attached to the implement tongue 4, said bearing rotatably supporting the implement shaft 13 therein. The arms 64 are pivoted on pintles 66 carried by a ring 67, and a pair of arms 68 pivot on the pintles 69 spaced 90° to the aforesaid pintles 66, the latter arms being secured to a sleeve 70 having suitable bearings therein for rotatably and slidably receiving the shaft section 42 of the telescopic shaft 16.

One of the important purposes of the present construction is to maintain the angles between each of the universal couplings and the respective shafts connected thereby as nearly equal as possible to obtain substantially uniform velocity in the driven shaft at all times and to avoid throwing any one universal coupling connection into dangerous angularity. Referring to Figures 2 and 3 for purposes of illustration, this is accomplished by properly positioning ring 55 longitudinally of the shaft couplings and at some point between the tandem universal couplings 17 and 18 so that the axis defined by the pintles 59 intersects the connecting link 30 somewhere near the central part thereof.

Figure 8:
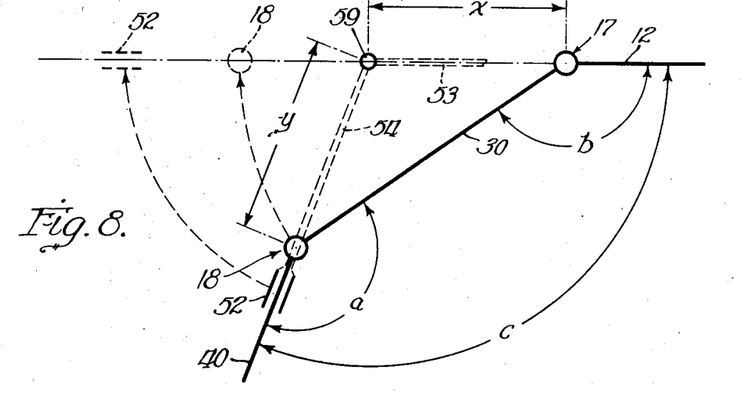
Figure 8 is a diagram for illustrating the principle underlying the universal drive of the present construction.
Figure 9:
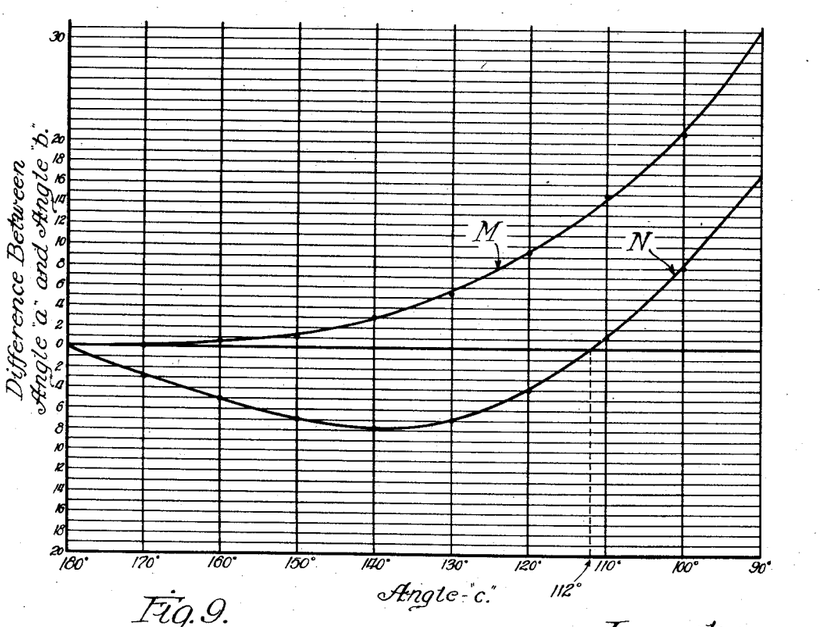
Figure 9 is a graphical representation substantially illustrating the principles of the present invention as regards the angular positions of one of the tandem universal units with respect to the axes of each of the shafts with which such unit is connected.

This relation of ring 55 to the couplings 17 and 18 can be more readily understood by referring to the diagram in Figure 8 and the graph in Figure 9. Horizontal swinging of arms 54 occurs about the axis of the pintles 59. Angles $a$ and $b$ (Figure 8) between couplings 17 and 18 and their shafts 12 and 40, respectively, will be substantially equal when angle $c$ is such that the perpendicular dropped from the axis 59 to the connection 30 bisects that member. But for all other values of angle $c$ which represents the angularity between the tractor and the implement, the angles $a$ and $b$ no longer are equal but are different because the connection 30 is of fixed length.

The differences between angles $a$ and $b$, when ring 55 is midway between the couplings, for various angular positions of shafts 12 and 40 corresponding to different values of the angle $c$ are depicted by the curve M in the graph of Figure 9. It will be noted that with this positioning of ring 55, the perpendicular dropped from the axis 59 to the connection 30 bisects that member, and therefore angle $a$ equals angle $b$, only when the tractor and implement are in direct fore and aft alinement and that as the angle $c$ decreases the difference between angles $a$ and $b$ increases.

In order to have the difference between angles $a$ and $b$ as small as possible over the entire working range, ring 55 has been so located relative to the couplings 17 and 18 so that the perpendicular from axis 59 to the connection 30 bisects that member when angle $c$ is approximately 112°, as illustrated in Figure 8. This has the result that as the angle $c$ varies from 112° in one direction the difference between the angles $a$ and $b$ increase, while if the angle $c$ varies from 112° in the other direction this difference between the angles $a$ and $b$ increases for a time until a maximum and then decreases as the shafts approach alignment or as the angle $c$ approaches 180° as will be seen from the graph of Figure 8. The difference between angle $a$ and angle $b$ does not exceed a maximum of 8° for any given angle of $c$ throughout the working range up to the point where angle $c$ is equal to 100°, which corresponds to an angular movement of 80° between the intermediate shaft 16 and the driving and driven shafts 12 and 13, respectively, or 160° as between the tractor and the implement. A sharper turn between the two vehicles would ordinarily not be required and as a rule not permissible without having the vehicles interfere with one another, it being obvious that each of the tandem universal couplings are capable of obtaining the same angular displacements above referred to.

The differences between angles $a$ and $b$ for various angles $c$ when ring 55 is disposed slightly rearwardly of the midway position between the couplings 17 and 18, are depicted by curve N in the graph of Figure 9. Here it is seen that the perpendicular dropped from axis 59 to the connection 30 bisects that member at some angle $c$ remote from the aligned positions of the vehicles as well as when the angle $c$ equals 180°.

When there is a difference between angle $a$ and angle $b$, which in the present instance at certain times is about 8°, shaft section 16 does not rotate at exactly uniform velocity. However, since the universal coupling 15 is similar to universal coupling 14 and is positioned in an end for end relation with respect to coupling 14, coupling 15 has a tendency to correct even this slight degree of non-uniformity of the velocity in shaft 16 in its transmission of this motion to shaft 13. In other words, shaft 13 will rotate more nearly with uniform velocity than shaft 16 and if angle $c$ for coupling 14 is equal to angle $c$ for coupling 15, shaft 13 will be rotated with absolutely uniform velocity.

It is apparent that ring 55 may be placed in various positions with respect to the units 17 and 18 to obtain various angular differences between angles $a$ and $b$ which may be permissible or desirable under different operating conditions. The position of ring 55 is easily adjusted by loosening cap screws 56 and shifting arms 53, whereby the whole universal mechanism associated therewith including ring 55 can be moved relative to shafts 12 and 40 and to the universal units therebetween.

All of the preceding explanation is also applicable to the coupling arrangement between the shafts 13 and 16 and a detailed description thereof is not deemed necessary.

It is further to be noted that when the vehicles make a turn, shaft 40 will be caused to move relative to sleeve 52 because of its universal connection with shaft 12, and shaft 42 will also be moved relative to sleeve 70 by reason of its universal connection with shaft 13. Both of these longitudinal movements of the shafts 40 and 42 are taken up by the telescopic means of the intermediate transmission shaft 16, the latter of course including the foregoing shafts as a unitary driving element.

When the tractor or implement tilts vertically relative to the other, as when passing over a hump or across a hollow. The division of angles between the universal couplings of each universal joint for angular displacements between the power take-off shaft 12 and shaft section 40 and between shaft section 42 and the driven implement shaft 13 occur in a vertical plane and such angular displacements are occasioned by the tilting of the tractor with respect to the implement in a similar manner as the angular displacements in a horizontal plane occur when the vehicles are making a turn. Since the angular displacements between shafts 12 and 40 are relatively small in a vertical plane, the theoretically correct position for pintles 58 for that small range would be barely off of the center point between the two universal couplings. But since the angular displacements are so small, pintles 58 can be positioned considerably to either side of the mid point between the couplings without causing any substantial difference in the angles assumed by the two couplings. Therefore, for the sake of simplicity, they have been placed in the same plane with pintles 59 making possible the utilization of the comparatively narrow circular ring 55 for supporting the pintles.

Figures 10, 11, 12:
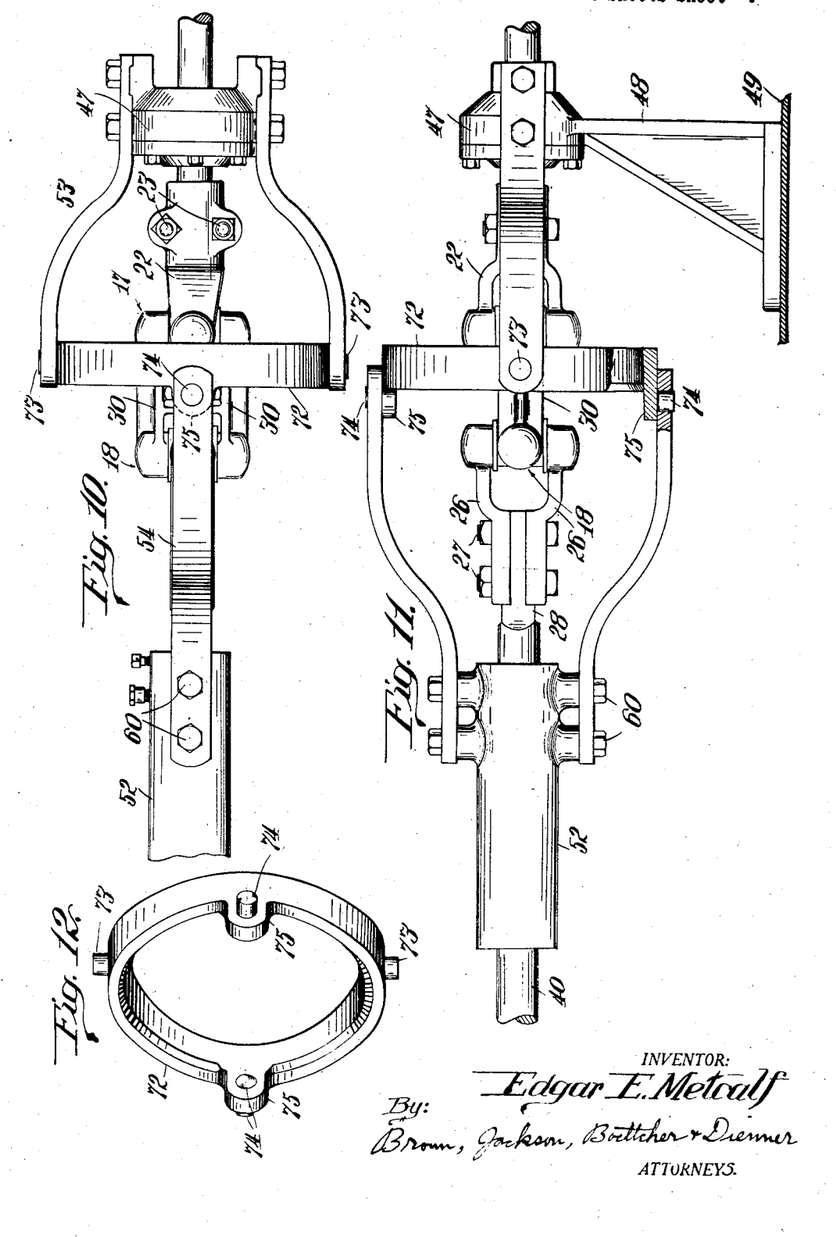
Figure 10 is a plan view of a modified construction of the universal connection.
Figure 11 is a side elevational view of the modified construction in Figure 10, partly broken away and in section.
Figure 12 is a perspective view of the ring element utilized in the modified construction.

A modified construction of the coupling appears in Figures 10, 11 and 12 which is more directly concerned with another type of ring 72 that has been substituted for ring 55 of the above described form of construction. The ring 72 is provided with pintles 73 to allow swinging movement of the sleeve 52 in a vertical plane. Horizontal swinging movement between the shafts 12 and 40 takes place on a vertical axis through pintles 74, and in this form of ring, the latter pintles have been offset relative to the ring and are carried by ears 75 projecting outwardly therefrom. The amount of offset is equal to the difference between the distances $x$ and $y$ when the shafts are in alignment or when the angle $c$ equals 180°. The purpose of providing a ring such as 72 is to make it possible to obtain shorter turns when such are desirable than are possible with a ring of the type utilized in the preferred construction. In a coupling such as illustrated in Figures 1, 2 and 3 the degree of turning is limited by the universal unit 14 striking the inner edge 55a of the ring 55. This edge is beveled to permit a slightly greater degree of turning. In the construction shown in Figures 10, 11 and 12 the ring is appreciably disposed nearer the power take-off shaft than to the swingable intermediate shaft 16 so that the latter is permitted to swing horizontally through a much greater angle when the implements are turning before the coupling strikes the ring.

To gain this advantage, the pintles 73 have been moved still further away from the theoretically correct position for most accurately dividing the angularity of the shafts 12 and 40 in a vertical plane, between the two universal couplings 19 and 20. Even in this position however, the double or tandem universal will still divide small angular vertical displacements substantially equal, and for all practical purposes this will occur within the ordinary range of normal working conditions.

Relative angular displacements between the shafts 12 and 40, in a horizontal plane will be the same as in the first described construction since pintles 74 are offset relative to the ring 72 and occupy a position substantially the same as pintles 59 in the construction shown in Figures 2 and 3. It is also possible to make the offset pintle connections with arms 64 adjustable if so desired.

When the modified coupling structure is utilized it is obvious that both couplings will be of the modified construction. Further description of the latter is not necessary since the remainder of the construction is the same as in the first described form, and for this reason, the same reference numbers have been applied thereto to indicate similar elements.

It is possible to vary either of the foregoing structures without departing from the scope of the present invention and such changes in the construction thereof are contemplated. I therefore do not intend to be strictly limited to the above specific description nor to the exact disclosures in the drawings, except insofar as the appended claims are so limited.

What I claim is:

1. The combination with two pivotally connected vehicles having a power take-off shaft and a driven shaft respectively, of power transmission mechanism comprising a telescopic shaft extending between said power shaft and said driven shaft, a tandem universal unit connecting said telescopic shaft and said power shaft, means connecting said telescopic shaft with said driven shaft, and means associated with said tandem universal unit and slidably cooperating with one end of said telescopic shaft for maintaining the angle between said unit and said power shaft substantially equal to the angle between the unit and said telescopic shaft when said vehicles are negotiating a turn.

2. The combination with two pivotally connected vehicles having a power take-off shaft and a driven shaft respectively, of power transmission mechanism comprising an intermediate shaft extending between said power shaft and said driven shaft, a tandem universal unit connecting said intermediate shaft and said power shaft, means connecting said intermediate shaft with said driven shaft, and independent means cooperating with said tandem universal unit and comprising a supporting means mounted on the adjacent vehicle for universal movement relative thereto and sleeve means carried by said supporting means and slidably cooperating with one end of said intermediate shaft, said independent means being capable of maintaining the angle between said unit and said power shaft substantially equal to the angle between said unit and said intermediate shaft when said vehicles are negotiating a turn.

3. The combination with two pivotally connected vehicles having a power take-off shaft and a driven shaft respectively, of power transmission mechanism comprising an intermediate shaft extending between said power shaft and said driven shaft, a tandem universal unit connecting said intermediate shaft and said power shaft, said unit including a pair of universal joints, means connecting said intermediate shaft with said driven shaft, and universal means cooperating with said tandem universal unit and comprising a first pair of arms fixedly mounted on the adjacent vehicle, a sleeve slidably cooperating with said intermediate shaft, a second pair of arms fixedly connected with said sleeve, and means connecting said first and second pair of arms for universal movement relative to each other, said universal means being capable of maintaining the angle between said unit and said power shaft substantially equal to the angle between said unit and said intermediate shaft when said vehicles are negotiating a turn.

4. The combination with two pivotally connected vehicles having a power take-off shaft and a driven shaft respectively, of a power transmission mechanism comprising a telescopic shaft extending between said power shaft and said driven shaft, a first cooperating universal joint means connecting said power shaft and said telescopic shaft and slidably cooperating with one end of the latter, second cooperating universal joint means connecting said driven shaft with said telescopic shaft and slidably cooperating with the other end of the latter, each of said universal joint means being capable of maintaining the respective shafts connected thereby at substantially equal angularity relative thereto for all movements of the vehicles relative to each other, said telescopic shaft accommodating changes in shaft length arising from the angularity at both of said universal joint means.

5. The combination with two pivotally connected vehicles having a power take-off shaft and a driven shaft respectively, of a power transmission mechanism comprising a telescopic shaft extending between said power shaft and said driven shaft, first cooperating universal means connecting said power shaft and said telescopic shaft and cooperating with one end of the latter, a second cooperating universal means connecting said driven shaft with said telescopic shaft and cooperating with the other end of the latter, said first and second universal means each comprising a tandem universal joint unit between the respective shafts connected thereby and an independent universal supporting means connected with the vehicle adjacent said coupling and having means for slidably cooperating with the adjacent end of the telescopic shaft, said independent universal supporting means functioning to maintain the angles between the respective shafts and the associated tandem universal unit substantially equal for all movements of the vehicles relative to each other.

6. The combination with two pivotally connected vehicles having a power take-off shaft and a driven shaft respectively, of a power transmission mechanism comprising first and second relatively movable intermediate shaft sections, universal coupling means connecting each of said shaft sections with said power and driven shafts respectively, and sleeve means mounted on each of said vehicles for universal movement relative thereto and for slidably receiving each of said shaft sections respectively therein, said shaft sections being movable relative to said sleeve when said vehicles are negotiating a turn, and a single means connecting said two shaft sections for positively transmitting the drive from one section to the other and for enabling said sections to move relatively away from or towards each other.

7. The combination with two pivotally connected vehicles having a power take-off shaft and a driven shaft respectively, of a power transmission mechanism comprising first and second intermediate shaft sections, a double universal unit connecting each of said shaft sections with said power and driven shafts respectively, and universal joint supporting means mounted on each of said vehicles and having sleeves for respectively receiving said shaft sections therein, each of said supporting means cooperating with one of said units to maintain the angles between said unit and the respective shafts connected thereby substantially equal when said vehicles are negotiating a turn, said shaft sections being movable relative to said sleeves, and single means connecting said two shaft sections for positively transmitting the drive from one section to the other and for enabling said sections to move relatively away or towards each other.

8. The combination with two pivotally connected vehicles having a power take-off shaft and a driven shaft respectively, of a power transmission mechanism comprising a third shaft extending between the aforesaid shafts, and universal drive means connecting the aforesaid shafts with said third shaft, each of said universal drive means including means for slidably engaging one end of the third shaft and for dividing the angular displacement between the respective shafts and the universal drive means connecting the same substantially equal when said vehicles are negotiating a turn or are traveling over uneven ground.

9. In combination with two pivotally connected vehicles having a power take-off shaft and a driven shaft respectively, a power transmission mechanism comprising a third shaft extending between the aforesaid shafts and universal drive means connecting the aforesaid shafts with said third shaft, each of said universal drive means comprising a pair of spaced universal joints directly connected and joining the third shaft with one of the aforementioned shafts, and an independent control mechanism comprising a first set of arms mounted on the adjacent vehicle, sleeve means for slidably receiving one end of said third shaft therein, a second set of arms fixedly attached to the sleeve means, and means pivotally connecting said two sets of arms for universal movement relative to each other, said means being so positioned longitudinally between the two spaced universal joints to control the division of the angles between said joints and the respective shafts connected thereby to maintain such angles substantially equal throughout a given range of angularity between the power take-off shaft and the driven shaft.

10. The combination with two pivotally connected vehicles having a power take-off shaft and a driven shaft respectively, of a power transmission mechanism comprising an intermediate shaft extending between the aforesaid shafts and universal drive means connecting the aforesaid shafts with opposite ends of said intermediate shaft, each of said universal drive means comprising a pair of spaced universal joints directly connected and joining the intermediate shaft with one of the aforementioned shafts, and an independent control mechanism comprising a first set of arms having a connection with the adjacent vehicle, sleeve means for slidably receiving the one end of said intermediate shaft therein, a second set of arms connected with said sleeve means, and ring means pivotally connecting said two sets of arms for universal movement relative to each other, said ring means being so positioned longitudinally with respect to the two spaced universal joints to control the division of the angles between said joints and the respective shafts connected thereby to maintain such angles substantially equal.

11. A motion transmitting means comprising a fixed shaft, a swingable shaft, coupling means connecting said shafts and means for substantially equalizing the angularity between the respective shafts and said coupling means when said swingable shaft assumes an angular relation to the fixed shaft, said means comprising a first set of arms fixedly supported adjacent the connection of said coupling means with said fixed shaft, a ring pivotally connected with said arms for swinging movement on a substantially horizontal axis, a second set of arms pivotally connected with said ring for movement on a substantially vertical axis, and a sleeve carried by the second set of arms and slidably cooperating with said swingable shaft.

12. A motion transmitting means comprising a relatively fixed shaft, a swingable shaft, coupling means including a pair of universal joints connecting said shafts, and means independent of said coupling means for substantially equalizing the angularity imposed upon said universal joints when said swingable shaft assumes an angular relation to the fixed shaft, said means comprising supporting means disposed adjacent the connection of said fixed shaft with said coupling means, and means pivotally mounted on said supporting means for universal movement relative thereto and slidably cooperating with said swingable shaft.

13. A motion transmitting means comprising a relatively fixed shaft, a swingable shaft, coupling means including a pair of universal joints connecting said shafts and disposed in fixed spaced relation to each other, and means independent of said coupling means for substantially equalizing the angularity imposed upon said universal joints when said swingable shaft assumes an angular relation to the fixed shaft, said means comprising articulated members constraining the fixed and swingable shafts to pivot relative to one another about an axis which is midway between said universal joints when said shafts have assumed an angular position intermediate their range of angularity.

14. A motion transmitting means comprising a fixed shaft, a swingable shaft, a double universal coupling therebetween having spaced universal joints connected together and connecting said shafts respectively, and means independent of said coupling cooperating between said shafts to maintain the angles between said respective shafts and said coupling substantially equal when the swingable shaft assumes an angular position relative to said fixed shaft, said means comprising a fixed support disposed adjacent the connection of said fixed shaft with the coupling, a ring encircling said coupling and having two sets of radially extending pintles on the periphery thereof, the first of said sets of pintles being pivoted on said fixed support to dispose said ring for movement on a substantially horizontal axis at a predetermined position relative to said spaced universal joints, and a sleeve slidably connected with said swingable shaft and pivotally mounted on said second set of pintles for swinging movement on a substantially vertical axis.

15. A motion transmitting means comprising a fixed shaft, a swingable shaft, a double universal coupling therebetween having spaced universal joints connected together and connecting said shafts respectively, and means independent of said coupling cooperating between said shafts to maintain the angles between said respective shafts and said coupling substantially equal when said swingable shaft assumes an angular position relative to said fixed shaft, said means comprising a fixed support disposed adjacent the connection of said fixed shaft with the coupling, a ring mounted on said support for swinging movement on a substantially horizontal axis and positioned beyond the midpoint between said spaced universal joints with respect to the swingable shaft to allow greater swinging movement of said swingable shaft, and a sleeve slidably connected with said swingable shaft and having pivotal connection with said ring on a substantially vertical axis offset from the aforesaid horizontal axis in a direction towards said swingable shaft and oppositely disposed to the midpoint between said spaced universal joints relative to said horizontal axis.

16. A motion transmitting means comprising a relatively fixed shaft, a swingable shaft, coupling means connecting said shafts comprising a pair of universal joints and means for maintaining said joints in fixed spaced relation to each other, and means connected with both of said shafts and extending directly therebetween independently of said coupling means for substantially equalizing the angularity between the respective shafts and said universal joints when said swingable shaft assumes an angular relation to the fixed shaft intermediate its normal range of operation.

17. The combination with two pivotally connected vehicles having a power take-off shaft and a driven shaft respectively, of a power transmission mechanism comprising a third shaft extending between the aforesaid shafts, a pair of tandem universal couplings each connecting said third shaft with one of the aforesaid shafts, each of said couplings comprising a pair of blocks pivotally connected with said third shaft and one of the aforesaid shafts respectively, on axes disposed in the same plane, and a connecting element having pivotal connection with each of said blocks on axes disposed in a plane substantially perpendicular to the aforesaid plane, and means associated with each of said couplings and slidably connected with the third shaft to maintain the angle between said third shaft and said coupling substantially equal to the angle between the other shaft connected with the coupling and said coupling.

18. The combination with two pivotally connected vehicles having a power take-off shaft and driven means respectively, of power transmission mechanism comprising an intermediate shaft extending between said power take-off shaft and said driven means, said intermediate shaft having a telescopic driving connection with said driven means, a tandem universal unit connecting said intermediate shaft and said power take-off shaft, and means associated with said tandem universal unit and slidably cooperating with one end of said intermediate shaft for maintaining the angle between said unit and said power take-off shaft substantially equal to the angle between the unit and said intermediate shaft when said vehicles are negotiating a turn.

19. The combination with two connected vehicles having a driving shaft and driven means respectively, of power transmission mechanism comprising a torque transmitting means extending between said driving shaft and connected with said driven means, a tandem universal unit connecting said torque transmitting means and said driving shaft, and means associated with said tandem universal unit and slidably cooperating with said torque transmitting means for maintaining the angle between said unit and said driving shaft substantially equal to the angle between said unit and said torque transmitting means when the vehicles assume various angular positions with respect to each other.

20. A motion transmitting means for connecting a pair of shafts adapted to be angularly displaced with respect to each other comprising coupling means including a pair of universal joints connecting said shafts means connecting said joints in fixed spaced relation to each other, and equalizer means independent of said coupling means for substantially equalizing the angularity imposed upon said universal joints when said shafts are angularly displaced with respect to each other, said equalizer means including a supporting means, and guide means connected with said supporting means for universal movement relative thereto and having slidable connection with one of said shafts.

21. A motion transmitting means for connecting a pair of shafts adapted to be angularly displaced with respect to each other comprising coupling means including a pair of fixedly connected universal joints connecting said shafts, and equalizer means independent of said coupling means for substantially equalizing the angularity imposed upon said universal joints when said shafts are angularly displaced with respect to each other, said equalizer means comprising a supporting means adapted for bodily movement directly with one of said shafts as the latter is angularly displaced with respect to the other of said shafts, and means connected directly between said supporting means and the other of said shafts for bodily lateral movement directly therewith, said latter means being movable endwise relative to said other shaft.

22. A motion transmitting means for connecting a pair of shafts adapted to be angularly displaced with respect to each other comprising coupling means including a pair of fixedly connected universal joints connecting said shafts, and equalizer means independent of said coupling means for substantially equalizing the angularity imposed upon said universal joints when said shafts are angularly displaced with respect to each other, said equalizer means comprising a supporting means for one of said shafts adapted for direct bodily movement therewith, means slidably connected with the other of said shafts and having bodily lateral movement directly therewith, and a universal mechanism for joining said latter means and said supporting means.

23. A motion transmitting means for connecting a pair of shafts adapted to be angularly displaced with respect to each other comprising a coupling means including serially connected universal joints disposed and fixed in spaced relation to each other for connecting said shafts, and equalizer means associated with said universal joints for equalizing the angularity imposed upon said universal joints when the shafts are angularly displaced with respect to each other, said equalizer means comprising a first means connected with one of said shafts for bodily lateral movement therewith, a second means connected with the other of said shafts for bodily lateral movement therewith, and pivotal means situated in a plane disposed substantially perpendicularly to the axis of rotation of said universal joints and between the same for pivotally connecting said first and second means.

24. The combination with two connected vehicles having driving and driven shafts, respectively, and an intermediate shaft extending therebetween, of tandem universal joints connected between the ends of said intermediate shaft and the driving and driven shafts, respectively, and equalizer mechanisms associated with each tandem universal coupling and comprising means for equalizing the angles between said coupling and the adjacent shafts connected thereby, said equalizer mechanisms, each comprising a bearing means for slidably cooperating with one end of said intermediate shaft, a supporting means mounted on the vehicle adjacent said one end of said intermediate shaft, and universal means for connecting said bearing means and said supporting means.

EDGAR E. METCALF.